(12) United States Patent
Leimbach et al.

(10) Patent No.: US 11,972,124 B1
(45) Date of Patent: Apr. 30, 2024

(54) USING DYNAMIC CAPABILITIES OF CLUSTER NODES TO SCHEDULE SERVICES IN A STORAGE CLUSTER

(71) Applicant: Dell Products, L.P., Hopkinton, MA (US)

(72) Inventors: David Leimbach, Mechanicsburg, PA (US); Michael L Burriss, Raleigh, NC (US)

(73) Assignee: Dell Products, L.P., Hopkinton, MA (US)

( * ) Notice: Subject to any disclaimer, the term of this patent is extended or adjusted under 35 U.S.C. 154(b) by 84 days.

(21) Appl. No.: 17/965,184

(22) Filed: Oct. 13, 2022

(51) Int. Cl.
  *G06F 3/06* (2006.01)
(52) U.S. Cl.
  CPC ............ *G06F 3/0629* (2013.01); *G06F 3/067* (2013.01); *G06F 3/0604* (2013.01)
(58) Field of Classification Search
  None
  See application file for complete search history.

(56) References Cited

U.S. PATENT DOCUMENTS

| | | | | |
|---|---|---|---|---|
| 8,296,419 | B1 * | 10/2012 | Khanna | G06F 9/5072 718/1 |
| 9,280,390 | B2 * | 3/2016 | Sirota | G06F 9/4881 |
| 9,843,536 | B2 * | 12/2017 | Miller | H04L 47/225 |
| 2013/0254196 | A1 * | 9/2013 | Babu | G06F 16/284 707/736 |
| 2019/0361626 | A1 * | 11/2019 | East | G06F 3/0629 |
| 2022/0261164 | A1 * | 8/2022 | Zhuravlev | G06F 3/0638 |
| 2022/0308759 | A1 * | 9/2022 | Zhao | G06F 11/004 |
| 2022/0382455 | A1 * | 12/2022 | Lee | G06F 3/0604 |

* cited by examiner

*Primary Examiner* — Elias Mamo
(74) *Attorney, Agent, or Firm* — Anderson Gorecki LLP (57) ABSTRACT

Each node of a storage cluster determines its capabilities and advertises the set of capabilities along with respective capability weights to other nodes of the storage cluster. Nodes monitor their systems for capability changes and, as capabilities of the nodes dynamically change, the dynamic changes to the node capabilities are similarly advertised. The advertised capabilities are passed to a cluster service manager which creates capabilities groups based on the advertised capabilities of the nodes. When a service is deployed to the storage cluster or moved within the cluster, the cluster service manager determines the set of required capabilities associated with the service, and uses the capabilities groups to identify nodes of the storage cluster for implementation of the service. Where more than one node has advertised the required sets of capabilities, the weights are used in an election process to determine which node should be used to implement the service.

16 Claims, 4 Drawing Sheets

USING DYNAMIC CAPABILITIES OF CLUSTER NODES TO SCHEDULE SERVICES IN A STORAGE CLUSTER

FIELD

This disclosure relates to computing systems and related devices and methods, and, more particularly, to a method and apparatus for using dynamic capabilities of cluster nodes to schedule services in a storage cluster.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, each node of a storage cluster determines its capabilities and advertises the set of capabilities along with respective capability weights to other nodes of the storage cluster. Nodes monitor their systems for capability changes and, as capabilities of the nodes dynamically change, the dynamic changes to the node capabilities are similarly advertised. The advertised capabilities are passed to a cluster service manager which creates capabilities groups based on the advertised capabilities of the nodes. When a service is deployed to the storage cluster or moved within the cluster, the cluster service manager determines the set of required capabilities associated with the service, and uses the capabilities groups to identify nodes of the storage cluster for implementation of the service. Where more than one node has advertised the required sets of capabilities, the weights are used in an election process to determine which node should be used to implement the service.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
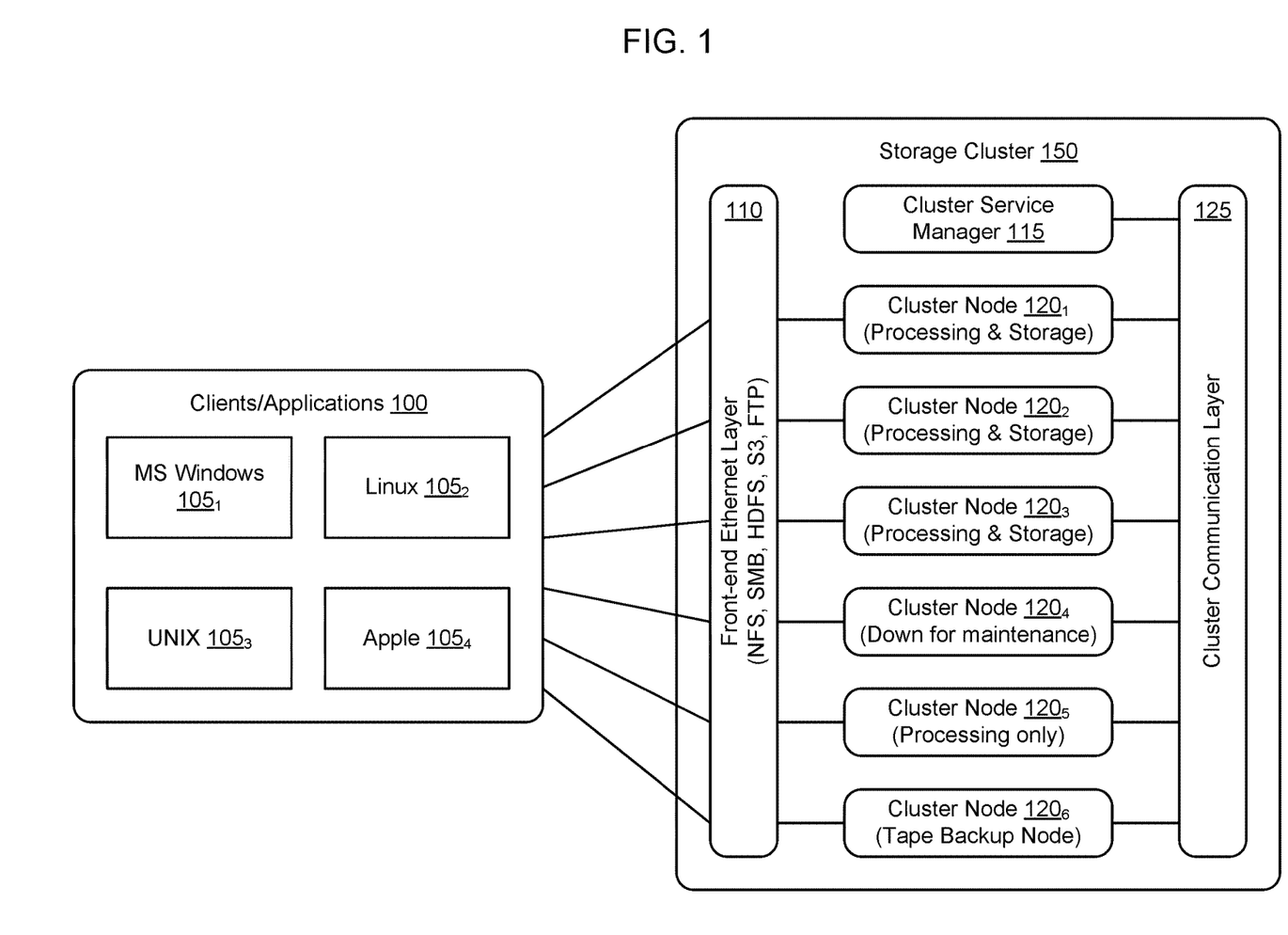
FIG. 1 is a functional block diagram of an example storage cluster connected to a set of client applications, according to some embodiments.

FIG. 1 is a functional block diagram of an example storage cluster 150 connected to a set of client applications 100, according to some embodiments. FIG. 1 depicts an example cluster architecture. As shown in FIG. 1, an example storage cluster 150 includes software, hardware, and networking all working together to provide a completely distributed single file system that can scale dynamically as workloads and capacity needs or throughput needs change in a scale-out environment.

One advantage of a implementing a storage cluster 150 of cluster nodes 120, is that the storage cluster 150 can be configured to scale, both in terms of performance and capacity. The storage cluster can also be configured to allow for any-to-any failover, and to provide multiple levels of redundancy that extend beyond the capabilities of RAID or other protected storage technologies well known within the industry. For convenience, cluster nodes 120 are referred to herein as "nodes" 120.

One example storage cluster may be configured using PowerScale™ hardware appliances available from Dell™. Hardware components can be added to or removed from a storage cluster at will and at any time. Other hardware components can similarly be used to implement a storage cluster. In some embodiments, the components of the storage cluster are orchestrated using an operating system. One example operating system is the OneFS™ operating system available from Dell™, which is configured to provide a unifying clustered file system with integrated scalable data protection on a storage cluster of nodes 120, although other cluster operating systems may be used as well.

As shown in FIG. 1, a single cluster consists of multiple nodes 120. In some embodiments, the nodes 120 are rack-mountable enterprise appliances containing memory, CPU, networking, Ethernet or low-latency InfiniBand interconnects, disk controllers and storage media. As such, each node in the distributed cluster has compute, and storage or capacity capabilities. As shown in FIG. 1, different nodes of the cluster may have different configurations, and multiple different types of nodes can be incorporated into a single storage cluster 150. For example, different nodes may be configured to provide varying ratios of capacity to throughput or input/output operations per second (IOPS).

Storage clusters are often comprised of various node types which can have different capabilities. For example, an accelerator node does not have a journal or storage which can be addressed by the cluster itself, but it does participate in lock management algorithms, and may or may not support client data access protocols like Network File System (NFS) or Server Message Block (SMB) depending on the existence and configuration of front-end network interfaces.

Further, some nodes may be configured to exist within a particular set of groupnets. Those groupnets are a collection of Domain Name System (DNS) configurations, subnets and address pools within those subnets. Groupnet configurations may be used, for example, to provide multi-tenancy as well as determine which nodes in a cluster should be used for support operations such as restricted shell environments and telemetry exports. Some properties of nodes are therefore more static than others (hardware configuration vs network configuration).

Unfortunately, some cluster operating systems such as OneFS are configured to almost always run all services on all nodes. Although some services can be augmented to be stopped if the external network interfaces become unavailable, even with this external network availability feature, developers struggle to build robust service management solutions within the normal operating system frameworks, and tend to create one-off services to manage and monitor other services. This leads to complexity in the architecture with all the associated problems of documenting behaviors, onboarding employees, and supporting shipping systems. Having more than one way of doing things also causes an increase in the cost to validate and write correct code within the architecture.

In some embodiments, each storage cluster 150 includes a cluster service manager 115. For example, in OneFS a service manager referred to as "MCP" is used as a cluster service manager that provides the ability to enable or disable services globally. Those services have dependencies on one another and in some cases, dependencies based on hardware capabilities. If all dependencies are met, the cluster service manager 115 will attempt to start any enabled service. This is inadequate, however, as some services must only be run on nodes 120 that work within a particular network configuration. Conventionally, the cluster service manager 115 has no visibility into this configuration, which leads to the creation of work arounds to make service management work as intended. This increases validation overheads, muddies the architecture, and makes supporting the product more difficult in the field.

According to some embodiments, nodes 120 of a storage cluster 150 advertise capabilities and the cluster service manager 115 is configured to use these dynamic capabilities to implement adaptive scheduling. This enables a more complete service management solution to be provided by the cluster service manager 115. Specifically, by requiring services to specify the dynamic capabilities that must be present for a service to start, the cluster service manager can then watch for the availability of these capabilities and start (or stop) services as needed. The service configuration requirements are also dynamically adjustable, and as the capabilities of the nodes change, those changed capabilities are advertised in real time. At the feature level, different capabilities and participation can also be managed. Nodes 120 therefore can participate or not participate in capabilities and services dynamically.

Additionally, in some embodiments, services or actions that only need to be run once are expressed using a dynamic attribute such as "run-once-per-cluster", that serves as a type of negative dependency. If no node 120 is currently advertising the ability to implement the run-once-per-cluster service, the cluster service manager 115 implements an election process to select a node 120 to provide the service. In some embodiments, this election algorithm can consider how many "run-once-per-cluster" services are already present on a given node 120 to avoid overloading individual nodes with too many of these types of services. These run-once attributes could also be triggered for services that perform operations only when needed throughout the life of the node 120, but don't need to run all of the time waiting for work. Example run-once per node services might be, for example, related to configuration changes or actions such as localized recovery or self-healing.

In some embodiments, the cluster service manager 115 is configured to create dependencies that anticipate spikes in resource utilization. In some embodiments, a service is able to be described as needing to run on a node 120 that has more local disk space or free memory than other services might need, in expectation of the increase in workload that will require the enhanced resources. By describing that availability as a required capability of a node 120 for placement of the service, cluster service manager 115 can make a placement decision for the service or in some instances determine that no node 120 has the requisite resources to accommodate the anticipated spike in resource utilization.

By enabling nodes to advertise capabilities, and enabling services to specify sets of capabilities required to run the particular services, it becomes possible for the cluster service manager 115 to create and manage capability groups based on groupings of capabilities. Nodes 120 change their capabilities over time either by user input, self-learning, resource detection, alerts, and self-healing events. As the capabilities of a node 120 change, the changed capabilities are advertised by the node 120 to the cluster service manager 115, which adjusts participation of the nodes in the capabilities groups. As a result, changing capabilities of the nodes 120 are able to affect participation of the nodes in particular services in a dynamic manner. These methods also allow new services or features created to be deployed on the storage cluster 150 to be incorporated in a simple way so that developers are not required to write one-off services to manage and monitor other services.

According to some embodiments, each node 120 of a storage cluster 150 advertises a set of dynamic capabilities, and an adaptive scheduler in the cluster service manager 115 uses the dynamic capabilities of the nodes 120 to produce a set of dynamically modifiable attributes describing the live capabilities of nodes 120. The adaptive scheduler associates those attributes as requirements to be met for the OneFS service manager (MCP) to consider the node 120 as eligible to run a particular service, or in connection with determining whether it is time to shut the service down on the node and let another node 120 take the role/responsibility. An overloaded node can advertise itself as being overloaded, and a node 120 that it somewhat idle can advertise its availability globally across the storage cluster 150 using OneFS group management capabilities (GMP), which serves as a type of fine-grained availability system that is able to communicate per-node capabilities to the rest of the storage cluster 150. By building an adaptive scheduler, it is possible to cause services to run where they're not only most compatible, but where they best fit, based on the advertised dynamic attributes of the nodes of the storage cluster 150.

As shown in FIG. 1, in some embodiments the nodes 120 of the cluster communicate with each other using a dedicated backend inter-cluster communication layer 125. For example, in some embodiments intra-node communication in a storage cluster 150 is performed across a dedicated backend network 125, that may be formed for example using a 10 Gb, 40 Gb, or 100 Gb Ethernet, or low-latency QDR InfiniBand (IB) network. This back-end network, which may be configured with redundant switches for high availability, acts as the backplane for the storage cluster 150. This configuration enables each node 120 to act as a contributor in the storage cluster 150 and isolates node-to-node communication to a private, high-speed, low-latency network. In some embodiments, the back-end network uses Internet Protocol (IP) for node-to-node communication.

Clients 100 connect to the storage cluster 150 using a front-end network 110 which may be implemented, for example, using an Ethernet network. Ethernet connections such as 10 GbE, 25 GbE, 40 GbE, or 100 GbE, in some embodiments, are available on all nodes. In some embodiments, the storage cluster 150 supports standard network communication protocols to the clients/applications 100, such as NFS, SMB, Hypertext Transfer Protocol (HTTP), File Transfer Protocol (FTP), Hadoop Distributed File System (HDFS), and Amazon Simple Storage Service (S3).

Figure 3:
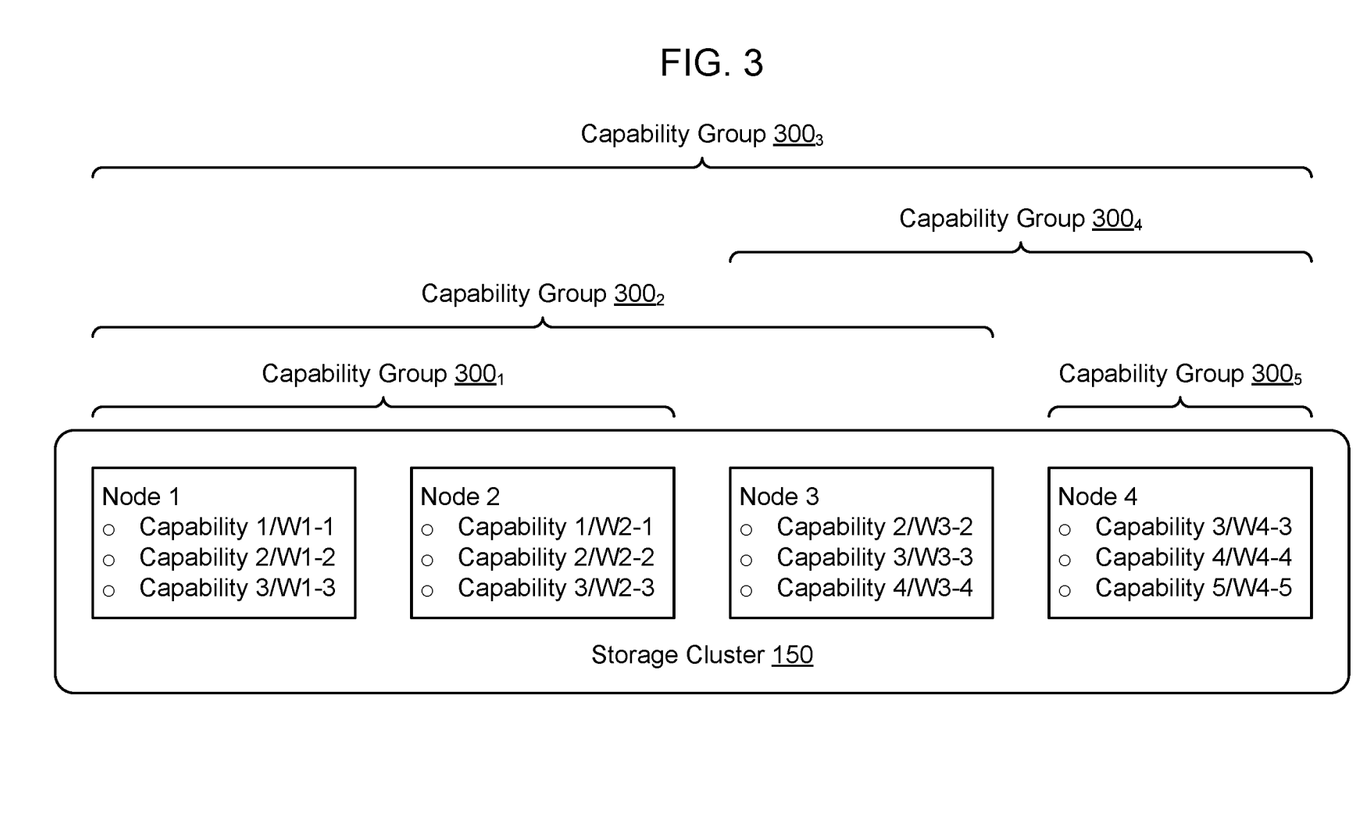
FIG. 3 is a functional block diagram of an example set of capability groups formed in connection with scheduling services to run on nodes of the storage cluster, according to some embodiments.

As noted above, in some embodiments, particular nodes can be configured with particular network addresses to cause those nodes to be configured to exist within a particular set of groupnets. Those groupnets are a collection of Domain Name System (DNS) configurations, subnets and address pools within those subnets. Groupnet configurations may be used, for example, to provide multi-tenancy as well as determine which nodes in a cluster should be used for support operations such as restricted shell environments and telemetry exports. In some embodiments, the network addresses, groupnets, subnets, and other front-end network characteristics of a node are advertised by the node as capabilities. Accordingly, if a particular service is to be deployed to a particular client that connects to the storage cluster 150 on a particular groupnet, the cluster service manager 115 can determine a capability group 300 of nodes 120 that have advertised the groupnet as a capability, to thereby deploy the service on a node that is accessible to the client 100 via the configured groupnet.

Figure 2:
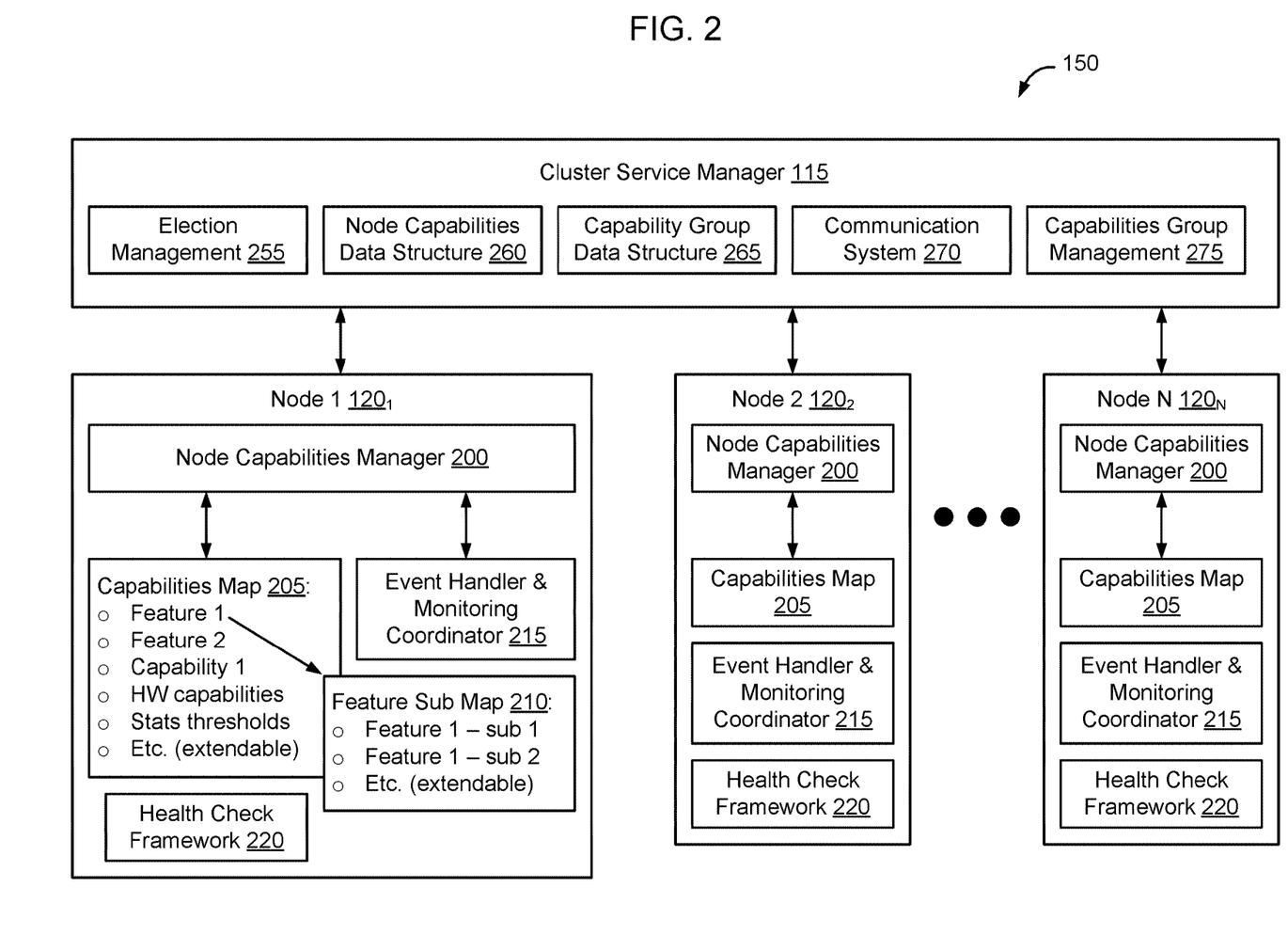
FIG. 2 is a functional block diagram an example storage cluster configured to use dynamically advertised capabilities of cluster nodes to schedule services to run on nodes of the storage cluster, according to some embodiments.

FIG. 2 is a functional block diagram an example storage cluster configured to use dynamically advertised capabilities of nodes 120 to schedule services, according to some embodiments. As shown in FIG. 2, in some embodiments, a storage cluster 150 includes a cluster service manager 115 and a plurality of storage cluster nodes 120. Storage cluster nodes 120 are referred to herein simply as "nodes" 120.

In some embodiments, each node 120 includes a node capabilities manager 200. The node capabilities manager 200 maintains a capabilities map 205 that contains entries for each capability of the node 120. Example capabilities might include features such as network (IP) interfaces, subnets, and other capabilities. Particular features might additional attributes specified in a feature sub-map 210. The capabilities map 205, in some embodiments, also includes information about the hardware capabilities of the node 120. Example hardware capabilities include the amount of processing power available at the node 120, the amount of storage capacity available at the node 120, and other physical features of the hardware that is used to implement the node 120. Different nodes 120 in the storage cluster 150 might be implemented using different types of hardware configurations, and as such each node 120 maintains its own capabilities map 205 with a set of features specifying its capabilities.

In some embodiments, each capability also includes a weight that is attached to the capability in the capabilities map 205 by the node capabilities manager 200. The capability specifies whether the node 120 has particular resources to support a given service. The weight enables the node capabilities manager 200 to specify whether those resources are otherwise being used. Accordingly, by setting a weight at a first value, the node capabilities manager 200 is able to advertise that the resources are available to be used to implement particular services. By setting the weight at a second value, the node capabilities manager 200 is able to advertise that the resources exist, but that it would be preferential to not use those resources to implement additional services since the resources are otherwise being used in connection with implementing other services. The weights advertised by the nodes may be binary, may be selected from a range of possible values, or may be other values depending on the implementation.

Each node advertises the capabilities of its capability map 205 to a cluster service manager 115. In some embodiments, the cluster service manager 115 may be implemented as a process executing on one or more of the nodes 120 of the storage cluster 150. The cluster service manager 115 creates capabilities groups (see FIG. 3) based on the capabilities advertised by the nodes. Nodes of like capabilities act in a capabilities group and, if required, can hold elections for operations that need to be handled by single nodes within the capabilities group. Some capabilities groups for particular capabilities can include all nodes of the storage cluster 150, whereas other capabilities groups might include a subset of the nodes 120 of the storage cluster 150, or only one node 120 of the storage cluster 150.

In some embodiments, the nodes use the weights in the election process, and chose an election weight relative to their capabilities to vote during the election process. By using weights, the election process is able to resolve a particular node from the capabilities group that is most able to assume responsibility for particular services that are to be implemented on the storage cluster 150. The services might be new services or might be services that are being moved from one node 120 of the storage cluster 150 to another node 120 of the storage cluster 150, for example in connection with failover of services between nodes 120 of the storage cluster 150 or if a service needs to be moved within the storage cluster, for example to move the service off an overloaded node 120.

Some services are operations that need to run once on the storage cluster 150, or that need to be run once on each node 120. For run once on storage cluster 150 operations or run once on node operations, nodes 120 enable/disable this capability, so that the cluster service manager 115 is able to decide an optimal node to be selected to run specific capabilities, services, tasks. Some operations could be services that start and exit immediately, but are run-once.

The capability map 205 also include other dynamically changing features of the node 120, such as usage statistics and various statistics thresholds specifying optimal operational parameters of the node 120.

In some embodiments, the node 120 includes an event handler and monitoring coordinator 215. The event handler and monitoring coordinator 215 monitors the node for changes in operational status, and uses the changes to update the capability map 205.

Events that affect capabilities come into the event handler and monitoring coordinator 215 to trigger actions against capabilities. Example events that affect node capabilities might include events associated with network outages, network changes, events associated with storage provided by the node 120 such as memory capacity full, one or more drives being determined to be down, resource overload, user input, etc.

In some embodiments, the event handler and monitoring coordinator 215 decides if a node needs to start participating in a capability that the node 120 otherwise was not participating in, or if the node 120 needs to stop participating in a capability that the node 120 otherwise was previously participating in. Starting to participate in a capability or stopping participating in a capability can be implemented by starting/stopping services, disabling parts of features, or modifying the weight of capabilities for services that might need to run here that the node 120 supports, but currently would prefer not to run due to resource constraints.

In some embodiments, the event handler and monitoring coordinator 215 decides, based on the statistics thresholds when to turn off capabilities. When the event handler and monitoring coordinator 215 determines that a capability has reached a threshold, it notifies the node capabilities manager 200, which in turn notifies the cluster service manager 115 and, hence, the other nodes 120 of the storage cluster 150.

In some embodiments, the cluster service manager 115, is able to override the event handler and monitoring coordinator 215 for non-hardware related reasons, for example if there are not enough nodes 120 participating in a particular capabilities group. The cluster service manager 115, for some capabilities groups, might require that all nodes 120 participate in the capabilities group regardless of the existence of statistics threshold breaches by various nodes 120.

In some embodiments, the nodes 120 include a health check framework 220 that continuously monitors the health of the node 120 and takes corrective action to implement self healing. In some embodiments, the event handler and monitoring coordinator 215 monitors events identified by the health check framework and updates the capability map 205 in coordination with actions of the health check framework. For example, as the health check framework disables particular features, fixes the features, and re-enables the features, the event handler and monitoring coordinator 215 monitors these actions and updates the capability map 205 accordingly.

FIG. 3 is a functional block diagram of an example set of capability groups 300 formed in connection with scheduling services in a storage cluster 150, according to some embodiments. In the example shown in FIG. 3, the storage cluster 150 includes four nodes. Nodes 1 and 2 both have advertised capabilities #1, #2, and #3. Node 3 has advertised capabilities #2, #3, and #4, and node 4 has advertised capabilities #3, #4, and #5. Each node has assigned a weight to each of the advertised capabilities, which is shown in FIG. 3 using weight values W.

Each of the advertised capabilities is used to create a respective capabilities group by the cluster service manager 115. For example, as shown in FIG. 3, nodes 1 and 2 have advertised capability #1, whereas nodes 3 and 4 have not advertised capability #1. Accordingly, capability group 3001 for capability #1 has been formed that includes nodes 1 and 2. Similarly, nodes 1, 2, and 3 have advertised capability #2, whereas node 4 has not advertised capability #2. Accordingly, capability group 3002 for capability #2 has been formed that includes nodes 1, 2, and 3. All nodes have advertised capability #3, and accordingly, the capability group 3003 for capability #3 includes nodes 1, 2, 3, and 4. Only nodes 3 and 4 have advertised capability #4, and accordingly, the capability group 3004 for capability #4 includes only nodes 3 and 4. The only node that advertised capability #5 was node 4 and, accordingly, a capabilities group 3005 for capability #5 includes only node 4.

Figure 4:
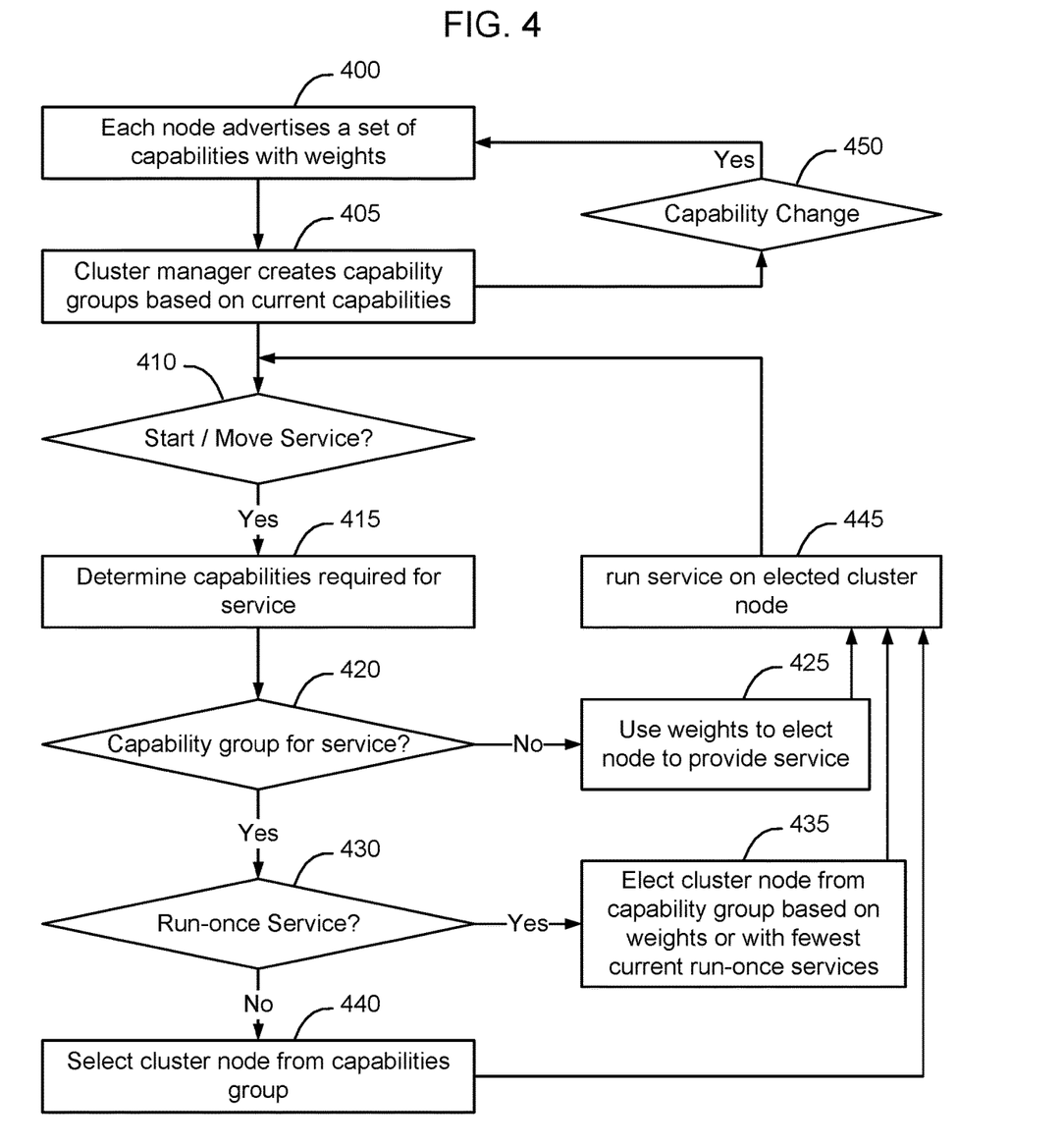
FIG. 4 is a flow chart of a process of using dynamically advertised capabilities of cluster nodes to schedule services in a storage cluster, according to some embodiments.

FIG. 4 is a flow chart of a process of using dynamically advertised capabilities of nodes 120 to schedule services in a storage cluster 150, according to some embodiments. As shown in FIG. 4, in some embodiments each node 120 of a storage cluster 150 determines its capabilities, stores the capabilities in a local data structure such as a capabilities map 205, and advertises the set of capabilities along with the respective capability weights (block 400). Capability weights are used, for example during an election process, to determine which of the nodes 120 with a particular advertised capability is most capable of performing a particular service.

The advertised capabilities are passed to a cluster service manager 115, and the cluster service manager 115 uses the advertised capabilities to create capability groups based on the current advertised capabilities (block 405). At any point during the process shown in FIG. 4, the capabilities of one or more of the nodes 120 might change (block 450). Whenever an event hander and monitoring coordinator 215 detects a change on a node 120, the capabilities map 205 of the respective node 120 is changed and the new set of capabilities is advertised by the node 120 to the cluster service manager 115 (block 400). Using the new set of capabilities, the cluster service manager 115 adjusts the capabilities groups (block 405). As shown in FIG. 4, in some embodiments the event handler and monitoring coordinator 215 on each of the nodes 120 is continually monitoring for capabilities changes and, as the updates occur (a determination of YES at block 450), provide the updated capabilities to enable the capabilities groups to be updated.

A determination is then made to start a service on the storage cluster 150 or to move a service within the storage cluster 150 (block 410). A new service might be a new connection from one of the clients/applications 100, a run-once type of service that will need to be implemented once on the storage cluster 150 or on each node 120 of the storage cluster 150, or another type of service that is to be implemented by one or more of the nodes 120 of the storage cluster 150. Moving a service within the storage cluster 150 might be associated with moving a workload from one node 120 to another node 120, for example in connection with load balancing, or might be associated with redistributing workload within the storage cluster 150 for example in connection with failure of one of the nodes 120.

If a determination is made to start or move a service (a determination of YES at block 410), in some embodiments the cluster service manager 115 determines a set of capabilities required to implement the service (block 415). Example capabilities might include processing capacity, storage capacity, network interfaces, and numerous other capabilities.

In FIG. 4 it is assumed that there is a single capability associated with the service and, accordingly, as shown in FIG. 4 the cluster service manager 115 determines whether a capability group exists for the capability (block 420). If there is no capability group for the capability required by the service (a determination of NO at block 420), in some embodiments the cluster service manager 115 uses an election process to select one of the nodes 120 of the storage cluster 150 to implement the service (block 425). In some embodiments, the election process uses the weights advertised by the nodes 120 in connection with other capabilities or related capabilities to determine a node 120 using the election process (block 425).

If a capabilities group is identified for the new service (a determination of YES at block 420), in some embodiments a determination is made as to whether the service is a run-once operation. As used herein, "run-once" operations are workloads that are implemented once on the storage cluster 150, or once on a node, and then end. Run-once operations are compared with other workloads, which are started on one or more of the nodes 120 of the storage cluster 150 and continue to execute on the storage cluster 150 over time. An example workload that might be implemented as a workload other than a "run-once" operation might be network attached storage operations presented to the storage cluster 150 from one of the clients/applications 100.

If the service is determined to be a "run-once" service (a determination of YES at block 430), in some embodiments a node 120 from the capabilities group is selected (block 435). In embodiments where the ability to execute run-once services is advertised as a weighted capability of the nodes 120, the weighted capabilities of the nodes of the capability group can be used to elect a node 120 in block 435. In embodiments where the ability to execute run-once services is not separately advertised as a weighted capability of the nodes 120, the node 120 with the fewest other currently executing run-once services can be selected to implement the new run-once service. In both instances, it is possible to distribute the run-once services between the nodes 120 of the capabilities group.

If the service is not a run-once service (a determination of NO at block 430), an election process is used to select one of the nodes 120 from the capabilities group (block 440). In some embodiments the weights are used to select the node 120 to implement the service from amongst the nodes 120 of the capabilities group. For example, if there are three nodes in a capabilities group 300, and two of the nodes 120 have advertised a weight value identifying those nodes 120 as being low on resources to implement additional services, the third node 120 would be selected during the election process. By advertising weighted capabilities, it is thus possible to distribute workload within the storage cluster 150 between nodes 120 that have particular capabilities and have advertised the availability of resources to implement additional services using the advertised capabilities.

Once a node 120 of the storage cluster 150 has been selected in block 425, block 435, or block 440, the service is run on the elected node 120 (block 445). The process then returns to wait for addition services that need to be allocated within the storage cluster 150.

As an example, instead of requiring the Embedded Service Enabler (ESE) configuration in OneFS to specify the network configurations that it supports, the client 100 can configure the correct network objects (groupnets have subnets and subnets have IP pools). Then the customer could tag that network object with a particular attribute. SmartConnect and FlexNet manage the networking in the nodes, and once a given node is running within the context of a particular network object, it could advertise the network objects as capabilities. The cluster service manager 215 can then assign the service to the node that advertised the network object as a capability, to cause the service to be deployed on the correct node.

As another example, a storage cluster may be comprised of heterogeneous node types and a single cluster might have Network Data Management Protocol (NDMP) backup or other accelerator nodes (which have lots of RAM and CPU but no storage for the cluster), or standard storage nodes that could be a mix of different node types or node models. Some nodes might have Integrated Dell Remote Access Controller (iDRAC) capabilities, and others may not. The set of services eligible to run on those nodes should vary based on the hardware capabilities of the node. Those can also be expressed in terms of dynamic capabilities. This can replace some or all of the HAL-based predicate system we use to determine which services are available at a given node.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of using dynamic capabilities of nodes of a storage cluster to schedule services in the storage cluster, comprising:
   determining, by each node of the storage cluster, a respective set of capabilities of the node;
   advertising, by each node of the storage cluster, the respective set of capabilities of the node;
   creating capability groups, by a cluster service manager, each capability group identifying a subset of nodes of the storage cluster that have advertised a particular capability associated with the capability group;
   determining a set of capabilities required for a service that is to be deployed on the storage cluster;
   identifying a corresponding set of capability groups based on the determined set of capabilities required for the service;
   selecting a node of the storage cluster to implement the service based on node membership in the corresponding set of capability groups.

2. The method of claim 1, wherein the respective set of capabilities of the node include hardware capabilities including an amount of processing power available at the node and an amount of storage capacity available at the node.

3. The method of claim 2, wherein advertising, by each node of the storage cluster, the respective set of capabilities of the node further comprises advertising weights associated with each of the capabilities, and wherein the advertised weights are based on current usage level of the processing power and current usage level of the storage capacity.

4. The method of claim 1, wherein the respective set of capabilities of each node comprises a set of network objects configured on the node.

5. The method of claim 4, wherein the network objects include DNS configurations, subnets, and address pools within the subnets.

6. The method of claim 4, wherein determining the set of capabilities required for the service that is to be deployed comprises determining a set of network objects required to be present on a node to enable the node to implement the service.

7. The method of claim 1, wherein the respective set of capabilities of each node comprises a weighted ability of the node to implement run-once-per-cluster services on the storage cluster.

8. The method of claim 7, further comprising determining that the service is a run-once-per-cluster service, and wherein selecting a node of the storage cluster to implement the service is based on the advertised weighted abilities of the nodes to implement the run-once-per-cluster service on the storage cluster.

9. The method of claim 7, further comprising determining that the service is a run-once-per-cluster service, determining that no node has advertised the ability to implement run-once-per-cluster services on the storage cluster, and implementing an election process to select a node to provide the run-once-per-cluster service on the storage cluster.

10. The method of claim 7, wherein the election process is implemented by selecting the node that is currently implementing the fewest number of other current run-once-per-cluster services on the storage cluster.

11. The method of claim 1, wherein advertising, by each node of the storage cluster, the respective set of capabilities of the node further comprises advertising weights associated with each of the capabilities.

12. The method of claim 11, wherein selecting the node of the storage cluster to implement the service based on node membership in the corresponding set of capability groups is further based on the advertised weights.

13. The method of claim 11, wherein the weights are associated with current usage levels of the respective capabilities on the nodes.

14. The method of claim 1, wherein determining the set of capabilities required for the service comprises requiring the service to specify, to the cluster manager, the dynamic capabilities that must be present for the service to be deployed on the storage cluster.

15. The method of claim 1, wherein the respective set of capabilities of the node is a dynamically changing set of capabilities, and wherein, advertising, by each node of the storage cluster, the respective set of capabilities of the node, comprises advertising the dynamically changing set of capabilities in connection with changes to the respective set of capabilities.

16. The method of claim 15, wherein the dynamically changing set of capabilities are determined by the nodes due to user input, self-learning of capabilities changes, resource usage level detection, local alerts, and self-healing events.

* * * * *